Sept. 16, 1958     R. M. WHEELER     2,852,737
AUTOMATIC HIGH POTENTIAL AND CONTINUITY TESTER
Filed Nov. 24, 1954
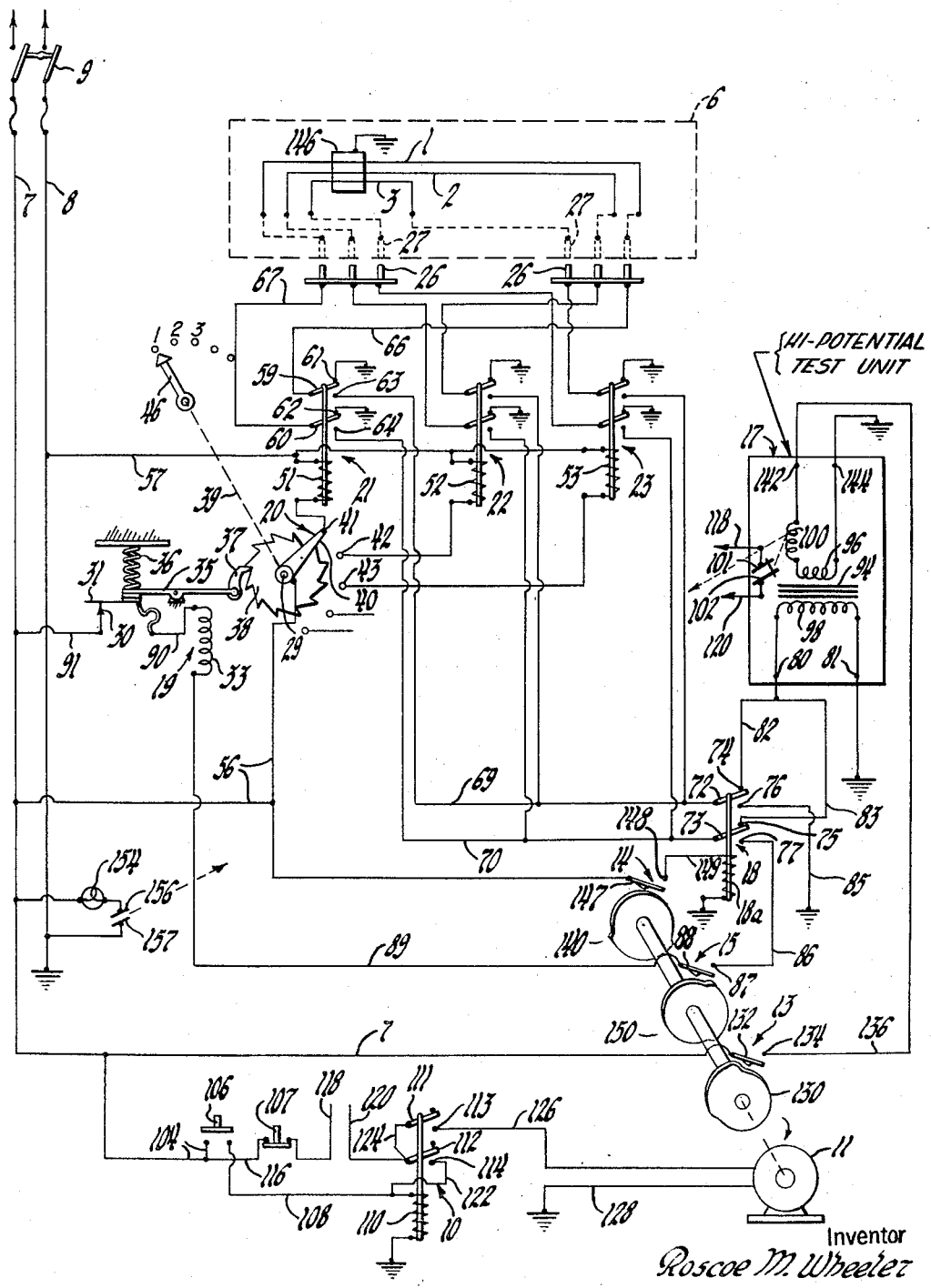
Inventor
Roscoe M. Wheeler
By
L. J. Burch
Attorney United States Patent Office 2,852,737
Patented Sept. 16, 1958

2,852,737

AUTOMATIC HIGH POTENTIAL AND CONTINUITY TESTER

Roscoe M. Wheeler, Flint, Mich., assignor to General Motors Corporation, Detroit, Mich., a corporation of Delaware Application November 24, 1954, Serial No. 470,986

6 Claims. (Cl. 324—51)

This invention relates to automatic electrical wiring inspection apparatus and, more particularly, to a high potential and continuity circuit tester for automatically and progressively testing each wire of a multi-wire unit, such as cable harnesses and the like, for insulation breakdown, short circuits, open circuits and wrong connections.

The invention has among its general objects to provide an automatic electrical wiring inspection tester which provides substantial savings in time required for testing complex wiring harnesses and the like over former test procedures, which is of simple and inexpensive construction and does not employ an undue number of relays and circuits nor parts of electronic character, and which is fully automatic in operation.

More specifically, the invention seeks to provide an automatic electric circuit testing apparatus for sequentially testing each wire or circuit of a multi-wire cable or circuit, for insulation breakdown and short circuits by applying a high potential between the test wire or circuit and ground to which all of the remaining wires or circuits are connected and sensing any leakage or short circuit current flow therein, and then for continuity by passing current through the wire or circuit under test to a stepping-type selector or scanning relay which, when actuated, automatically advances the selector apparatus to the next succeeding circuit or wire. In the event of faulty insulation, short circuit, open circuit or wrong connection, the scanner apparatus will not advance to the next wire or circuit but will indicate which wire or circuit is defective.

The manner in which the above and other objects are accomplished, together with the advantages and features of the present invention, will appear more fully from the following description and schematic circuit drawing illustrating the basic electrical circuit organzation of the invention.

In the drawing there is shown a group of insulated wire conductors or circuits 1, 2, 3 . . . etc., which are assembled either individually or in a wiring harness on a wiring or harness board 6, to be tested with the apparatus of the present invention. The test apparatus includes a pair of fused line conductors 7 and 8 which are adapted to be connected to a local A. C. power source such as 110 volts, through main switch 9, and further includes a D. P. S. T. starting or master control relay 10 for the timing drive motor 11 of a number of cam operated switches 13, 14, 15 which control the application of line voltage to a high potential test unit 17, a test selector control relay 18 and a stepping-type continuity check relay 19 having a test wire or circuit scannning selector switch 20 associated therewith.

Individual test circuit control relays such as 21, 22, 23 . . . etc. selectively activated through switch 20 are provided to connect the terminals of the particular wire or circuit with which each individual control relay is associated to the test apparatus through plug and jack terminal connections as 26, 27 which are associated with the terminals of the wiring board 6 and the contacts of the individual control relays, shown as being of the D. P. D. T. variety. The test selector control relay 18 also is of the D. P. D. T. variety and, depending upon the condition of energization of its operating coil 18a, controls the application of either a high potential test voltage from the output of the high potential test unit or line voltage from line conductors 7, 8 to the particular test wire or circuit that is connected to the test apparatus through the front contacts of the individual test circuit control relay activated by the selector switch of the stepping relay.

The stepping relay 19 includes a stationary contact 30 and a movable contact 31 in circuit controlling relation with the operating coil 33 thereof and further includes a fulcrumed armature element 35 having a spring 36 at one end to maintain the contacts 30, 31 in the normally closed position shown and a pawl element 37 on the other end thereof operatively associated with a toothed wheel 38. Secured to and carried by the shaft 39 of the wheel 38 is the switch arm 40 of the test wire or circuit selector switch 20 having a number of stationary contacts 41, 42, 43 . . . etc. associated therewith and a pointer arm 46 of a test wire or circuit indicator, pointing to spaced numerical indicia 1, 2, 3 . . . etc. to indicate the particular test wire or circuit connected at any moment to the test apparatus.

With switch arm 40 of the selector switch 20 in engagement with contact 41, the operating coil 51 of the first individual control relay 21 is connected in a circuit which extends from conductor 56 between line conductor 7 and selector switch arm 40, contact 41, coil 51, and conductor 57 connected to line conductor 8, shown grounded. Closure of switch 9 connects coil 51 for energization from the power line, moving switch arms 59 and 60 of relay 21 from the grounded back contacts 61, 62 to the front contacts 63, 64 thereof. The terminal ends of test wire 1 are connected from the plug and jack terminals 26, 27 over conductors 66 and 67 to the switch arms 59 and 60 of the relay 51 and through contacts 63 and 64 to conductors 69 and 70 constituting a pair of test mains of a test bus through which the test wires are connected to the test apparatus. Conductors 69 and 70 are in turn connected to the switch arms 72, 73 of the high potential-continuity test selector relay 18 the normally closed back contacts 74, 75 of which are connected to the ungrounded output terminal 80 of the high potential test unit over conductors 82, 83, as shown. The front contact 76 associated with switch arm 72 of relay 18 is grounded over conductor 85, while the front contact 77 associated with switch arm 73 is connected over conductor 86 to the energizable contact 87 of cam switch 15, the movable switch arm 88 of which is connected over conductor 89 to one side of the operating coil 33 of the stepping relay 19. The other side of the stepping relay coil 33 is connected over conductor 90 through its normally closed contacts 30, 31 and conductor 91 to line conductor 7.

In its simplest form the high potential test unit 17 may comprise a high voltage step-up transformer 94 having a primary winding 96, which is adapted to have the voltage of the supply conductors 7, 8 applied thereto, and a high voltage secondary winding 98 supplying an output voltage of, say, 1000 volts or more across its terminal 80 and grounded terminal 81 for the high potential or insulation breakdown and short circuit test. In circuit with the primary winding 96 of the step-up transformer is a leakage current control relay winding 100 having a pair of normally closed contacts 101, 102 which are connected in circuit controlling relation with the starting or master control relay 10.

The starting or master control relay 10 is connected for energization from line conductor 7 and grounded line conductor 8 in a circuit which includes conductor 104 connected to line 7, start push-button 106, and conductor 108 connected to the ungrounded side of the operating coil 110 of relay 10. Energization of the operating coil 110 causes switch arms 111 and 112 to engage the normally open front contacts 113 and 114 thereof and establishes a hold-in circuit for the operating coil after the start button 106 is released, extending from line conductor 7, conductor 104, conductor 116, stop button 107, conductor 118, the normally-closed contacts 101 and 102 of control relay 100, conductor 120, switch arm 112 and front contact 114 of relay 10, and conductor 122 connected to the ungrounded side of the master relay coil 110.

The operation of the master control relay also establishes an energizing circuit through the normally closed contacts 101 and 102 of the relay 100, conductor 124, upper switch arm 111 and front contact 113, and conductor 126 connected to one side of the cam drive motor 11, the other side of which is connected to ground over conductor 128. Clockwise rotation of the cam drive motor first causes cam 130 to close switch 13 and completes an energizing circuit from line conductor 7 through arm 132 and contact 134 of the cam actuated switch 13, conductor 136 connected to the ungrounded input terminal 142 of the high potential test unit, the other input terminal 144 of which is grounded. Cam switches 14 and 15 are open during this interval so that the test selector relay 18 and continuity check stepping relay 19 are de-energized and a high potential voltage is applied between the test wire 1 and ground through switch arms 72 and 73 of relay 18, conductors 69 and 70, contacts 63 and 64 and switch arms 59 and 60 of relay 21 connected to the ends of test conductor 1.

The insulated test wires are clamped to the harness board 6 by means of a clamp 146 which is connected to ground so that in the event of insulation breakdown or of a grounded or short circuited conductor, current will flow from the wire under test to ground. This current flows in the secondary winding of the transformer 94 of the high potential test unit 17 constituting a load thereon and will cause an increased amount of current to be drawn by the primary winding 96 and the winding 100 of the control relay. The control relay 100 is so designed as to trip or operate for leakage currents in excess of one milliampere. In the event of a short circuit to ground or to any of the remaining test wires or circuits, which are grounded through the normally closed back contacts thereof, the short circuit current flowing in the secondary winding of the high potential transformer 94 will cause currents in excess of this figure to be drawn by the primary winding and trip the relay 100. Operation of the relay 100 opens the normally-closed contacts 101 and 102 thereof and disables the hold-in circuit of the master control relay 10 and also interrupts energization of the cam drive motor 11 so as to stop the test unit. The position of the pointer arm 46 of the circuit indicator associated with the stepping relay 19 will then indicate that test wire which is defective.

In the event of a successful high potential test on wire 1, the cam drive motor 11 will continue operating and cam 130 will open switch 13. Shortly afterwards cam 140 will then be rotated into position to close cam switch 14 and establish an energizing circuit for coil 18a of the test selector relay 18 over line 7, conductor 56, switch arm 147 and contact 148 of cam switch 14, and conductor 149 connected to the ungrounded side of coil 18a of relay 18. This energizes coil 18a and moves switch arms 72 and 73 to engage the front contacts 76, 77 thereof and conditions or connects the test wire for a continuity check to be performed thereon.

While cam switch 14 is still closed and shortly before opening thereof, cam 150 closes cam switch 15 and establishes a series energizing circuit for relay coil 33 of stepping relay 19 over a circuit which extends from line conductor 7, conductor 91, contacts 30 and 31, conductor 90, relay coil 33, conductor 89, switch arm 88 and now energized contact 87 of cam switch 15, conductor 86, front contact 77 and switch arm 73 of selector relay 18, conductor 70, front contact 64 and switch arm 60 of control relay 21, conductor 67, test wire 1, conductor 66, switch arm 59 and front contact 63 of relay 21, conductor 69, switch arm 72 and front contact 76 of relay 18, and conductor 85 connected to ground. The above traced circuit applies line voltage through the operating coil 33 of the relay 19 and the test wire in series and in the event that the wire under test is continuous, current will flow through this relay coil and the test wire to ground.

Energization of the relay coil 33 causes the pawl end 37 of the fulcrumed armature 35 to be attracted downwardly so that the pawl will slip by the tip of the tooth immediately behind or below the tooth now engaged by the pawl in the drawing. The other end of the pivoted armature is caused to move upwardly against the bias of the spring 36 and separates contact 31 from contact 30, thereby interrupting the energization of the relay coil 33 and permitting the spring to return the armature to the position shown. In returning to the normal position shown, pawl 37 engages the tip of the tooth adjacent that shown and advances the toothed wheel one step or notch. This carries the switch arm 40 of the selector switch from contact 41 to contact 42 to de-energize the operating coil 51 of individual control relay 21 and to energize the operating coil 52 of individual control relay 22 which then places test wire 2 in circuit with conductors 69 and 70 of the test apparatus so that the high potential and continuity test may be performed thereon.

In the event of the successful completion of a high potential and continuity test on wire 2, the stepping switch 19 will advance automatically to activate coil 53 of control relay 23 and connect wire 3 to the test apparatus and so on, until all of the wires or circuits have been inspected. Throughout the progressive scanning and testing of the wires under inspection, the timing drive motor 11 driving the cam-actuated switches will rotate continuously and stop only in the event of an unsuccessful high potential test which may be indicated as by a pilot lamp 154 connected in a circuit across line conductors 7 and 8 through an auxiliary pair of normally open contacts 156, 157 of relay 100. In such case, lamp 154 will be illuminated, the drive motor 11 will have stopped and the circuit indicator 46 will point to the particular wire or circuit that is shorted, grounded or possessed of faulty insulation and needs to be replaced.

If two wires should be shorted together, the apparatus will stop during the high potential test performed on each wire and thus indicate the particular wires that are shorted. In the event of an unsuccessful continuity check, the drive motor will continue to rotate but the stepping relay 19 will not advance the selector switch 20 and the circuit indicator 46.

What is claimed is:

1. A high potential and continuity tester for testing a plurality of electrical conductors in sequence including a source of test current; a high potential test unit; a test bus; test selector switching means operable to connect said test bus in a high potential test circuit with said high potential test unit and, alternatively, in a continuity test circuit including said current source; an individual control relay for each of said conductors including an operating coil and a switch arm operable between two positions connecting the terminals of each conductor associated therewith to ground in one position thereof and individually to said test bus in the other position; a stepping relay including an operating coil connected in said continuity test circuit and a multiple position conductor selector switch progressively advanced upon each operation of said stepping relay to connect the operating coil of a different one of said individual control relays for energization from said current source; means controlling the operation of said test selector switching means, and current responsive means in said high potential test unit indicating a faulty conductor when the current drawn by said unit is in excess of a predetermined value.

2. A high potential and continuity tester for testing a plurality of insulated electrical conductors in sequence including a source of test current; a high potential test unit; a test bus; test selector switching means operable to connect said test bus in a high potential test circuit with said high potential test unit and, alternatively, in a continuity test circuit including said current source; an individual control relay for each of said conductors including an operating coil and a switch arm operable between two positions connecting the terminals of the conductor associated therewith to ground in one position thereof and to said test bus in the other position; a stepping relay including an operating coil connected in said continuity test circuit and a multiple position conductor selector switch progressively advanced upon each operation of said stepping relay to connect the operating coil of a different one of said individual control relays for energization from said current source; timing means controlling the operation of said test selector switching means; and current responsive means in said high potential test unit operable to disable said timing means when the current drawn by said test unit is above a predetermined value.

3. The combination in accordance with claim 2 above wherein said timing means comprises an electric motor driving a plurality of cam-actuated switches one of which controls the operation of said high potential test unit, another the operation of said test selector switching means and another the operation of said stepping relay.

4. In a continuity tester for multiple electrical cables, a source of electrical power, means for supporting a cable under test so that both ends are available for connection, a plurality of switching means connectible to both ends of each conductor, an actuating means for each switching means, stepping switching means connected to each actuating means and to the source of electrical power to complete a circuit sequentially to each actuating means, an operating coil for said stepping switching means connected to said source of electrical power and to the first named plurality of switching means to be sequentially connected in series with each of the conductors and energized by current flow therethrough to test the continuity of each electrical conductor.

5. In a continuity tester for multiple electrical cables, a source of electrical power, means for supporting a cable under test so that both ends are available for connection, a plurality of switching means connectible to both ends of each conductor, an actuating means for each switching means, stepping switching means connected to each actuating means and to the source of electrical power to complete a circuit sequentially to each actuating means, an operating coil for said stepping switching means connected to said source of electrical power and to the first named plurality of switching means to be sequentially connected in series with each of the conductors and energized by current flow therethrough to test the continuity of each electrical conductor and timed switching means connected in circuit between the operating coil and the plurality of switching means.

6. In a continuity tester for multiple electrical cables, a source of electrical power, means for supporting a cable under test so that both ends are available for connection, a plurality of switching means connectible to both ends of each conductor, an actuating means for each switching means, stepping switching means connected to each actuating means and to the source of electrical power to complete a circuit sequentially to each actuating means, an operating coil for said stepping switching means connected to said source of electrical power and to the first named plurality of switching means to be sequentially connected in series with each of the conductors and energized by current flow therethrough to test the continuity of each electrical conductor, timed switching means connected in circuit between the operating coil and the plurality of switching means and indicating means connected to the stepping switching means to indicate the faulty conductor if the coil is not energized to continue sequential testing.

References Cited in the file of this patent

UNITED STATES PATENTS

| 2,584,680 | Doncyson | Feb. 5, 1952 |
| 2,593,131 | Foust | Apr. 15, 1952 |
| 2,622,130 | Kabell | Dec. 16, 1952 |